Patented Sept. 4, 1945

2,384,048

UNITED STATES PATENT OFFICE 2,384,048

MANUFACTURE OF ORGANIC NITROGEN COMPOUNDS

Arthur Ernest Wilder Smith and Charles William Scaife, Norton-on-Tees, England, assignors to Imperial Chemical Industries Limited, a corporation of Great Britain No Drawing. Application October 20, 1943, Serial No. 507,046. In Great Britain September 2, 1942

6 Claims. (Cl. 260—644)

This invention relates to the reaction of nitrogen tetroxide with ethylene at a low temperature.

In specification Serial No. 450,141 we have disclosed a process of reacting nitrogen tetroxide with ethylene at a low temperature which produces 1:2-dinitroethane and in addition $\beta$-nitroethanol and $\beta$-nitroethyl nitrate.

We have found that in this process the amount of ethylene used cannot be increased beyond about 15–25% of that equivalent to the nitrogen tetroxide without the danger of spontaneous decomposition. Also in removing excess nitrogen tetroxide from the reaction products, the danger of explosion due to the building up of pressure is such that it is advisable to allow free escape of the excess nitrogen tetroxide and not to attempt its recovery.

We have now found that by carrying out the reaction in the presence of oxygen, the ratio of ethylene to nitrogen tetroxide can be increased and moreover it is possible to recover excess nitrogen tetroxide from the reaction products.

When the reaction between nitrogen tetroxide and ethylene is carried out with the nitrogen tetroxide in the liquid phase, it is preferable to pass the oxygen into the nitrogen tetroxide if desired in admixture with the ethylene.

The amount of oxygen required varies with the reaction conditions, but in general, 10–30% by volume of the ethylene is suitable. Air or any other mixture of oxygen with an inert gas may be used instead of pure oxygen, but a greater amount of oxygen will then be required.

A beneficial effect is produced by introducing oxygen at any time during the reaction, but it is desirable for the best results to introduce it from the commencement of the reaction, more especially when air or other mixtures of oxygen with inert gases are employed.

The nitrogen tetroxide should contain little or no nitric acid or substances which would give rise to it under the reaction conditions, but nitric oxide is not detrimental as it is when the reaction is carried out in the absence of oxygen. The ethylene should contain little or no other olefines and little or no alcohol, ether or substances which would give rise to these compounds under the reaction conditions.

Example 4400 grams of pure dry liquid nitrogen tetroxide were placed in a coiled reactor surrounded in a cooled methanol bath at 2° C. Pure dry ethylene together with 15% of its volume of oxygen was then passed into the liquid nitrogen tetroxide in a stream of fine bubbles over a period of 7 hours until 276.7 litres of ethylene had been absorbed. The reaction mixture was then withdrawn and the excess nitrogen tetroxide blown off with air and recovered. The degassed mixture was then poured into methanol cooled externally by means of a mixture of solid carbon dioxide and methanol, and stirred. Solid 1:2-dinitroethane was thereby thrown out of solution and was separated from the mother liquor by filtration. The yield of dinitroethane was 475 grams. The methanol was removed from the filtrate, the residual oil treated on the vacuum pump for four hours, and then extracted by a mixture of benzene and water. The aqueous layer was neutralised, extracted with ether, the ether removed and the remainder distilled to give 142 grams $\beta$-nitroethanol. After removal of benzene from the benzene layer distillation gave 262 grams $\beta$-nitroethyl nitrate.

When carrying out the reaction under comparable conditions but in the absence of oxygen, the absorption of ethylene was discontinued when 150.5 litres of ethylene had been absorbed. The excess nitrogen tetroxide had then to be carefully removed by evaporation in the cold and allowing free escape of the nitrogen tetroxide to atmosphere. Moreover, special care had to be taken towards the end of the evaporation to keep the boiler cool to prevent heating due to autocatalytic decomposition of side products. Solid 1:2-dinitroethane was recovered from the degassed mixture as when using oxygen, and the yield was 152 grams. The filtrate was then treated as when using oxygen and 49 grams of $\beta$-nitroethanol and 80 grams of $\beta$-nitroethyl nitrate were recovered.

We claim:

1. In a process for reacting ethylene with liquid nitrogen tetroxide, the step of passing oxygen into the liquid nitrogen tetroxide during at least part of the reaction period.

2. In a process for reacting ethylene with liquid nitrogen tetroxide at a temperature not exceeding 15° C., the step of passing oxygen into the liquid nitrogen tetroxide during at least part of the reaction period.

3. In a process for reacting ethylene and liquid nitrogen tetroxide, the step of passing an oxygen-containing gas into the liquid nitrogen tetroxide during at least part of the reaction period.

4. In a process for reacting ethylene with liquid nitrogen tetroxide at a temperature not exceeding 15° C., the step of passing an oxygen-containing gas into the liquid nitrogen tetroxide during at least part of the reaction period.

5. The process for preparing dinitroethane which comprises reacting ethylene with liquid nitrogen tetroxide, introducing oxygen into the nitrogen tetroxide during at least a portion of the reaction period, removing the excess nitrogen tetroxide, and recovering solid dinitroethane.

6. The process of claim 5, in which oxygen is introduced into the nitrogen tetroxide in mixture with an inert gas.

ARTHUR ERNEST WILDER SMITH.
CHARLES WILLIAM SCAIFE.